Aug. 26, 1924.                                              1,506,149
                        G. W. BEADLE
        MACHINE FOR MOLDING PLASTIC MATERIAL AND THE LIKE
                 Filed April 16, 1920      6 Sheets-Sheet 1

Fig. 1

Inventor
                                         George W. Beadle
                   By his Attorney
                     W. Laird Goldsborough Aug. 26, 1924.

G. W. BEADLE

1,506,149

MACHINE FOR MOLDING PLASTIC MATERIAL AND THE LIKE

Filed April 16, 1920     6 Sheets-Sheet 2

Fig. 2

Inventor
George W. Beadle
By his Attorney
W. Laird Goldsborough

Aug. 26, 1924.  
G. W. BEADLE  
MACHINE FOR MOLDING PLASTIC MATERIAL AND THE LIKE  
Filed April 16, 1920   6 Sheets-Sheet 5

Inventor  
George W. Beadle  
by W. Laird Goldsborough  
his Attorney

Aug. 26, 1924.

G. W. BEADLE 1,506,149

MACHINE FOR MOLDING PLASTIC MATERIAL AND THE LIKE

Filed April 16, 1920   6 Sheets-Sheet 6

Inventor
George W. Beadle
By his Attorney
W. Laird Goldsborough

Patented Aug. 26, 1924.

1,506,149

UNITED STATES PATENT OFFICE.

GEORGE W. BEADLE, OF STAMFORD, CONNECTICUT, ASSIGNOR, BY MESNE ASSIGNMENTS, TO COLUMBIA PHONOGRAPH COMPANY, INC., A CORPORATION OF NEW YORK.

MACHINE FOR MOLDING PLASTIC MATERIAL AND THE LIKE.

Application filed April 16, 1920. Serial No. 374,484.

*To all whom it may concern:*

Be it known that I, GEORGE W. BEADLE, a citizen of the United States, residing at Stamford, in the county of Fairfield and State of Connecticut, have invented certain new and useful Improvements in Machines for Molding Plastic Material and the like, of which the following is a full, clear, and exact description.

My invention relates to machines for molding various objects, but more particularly flat phonograph sound records. In the manufacture of sound records great care is required to keep the dies of the record-forming molds in perfect condition. Particles of die-adhering matter which in the molding of many objects would be of no consequence, are of utmost consequence in sound record manufacture. Such matter unless removed from the die would cause imperfections in the reproduction of sound obtained from the record made with such die. Various expedients have been proposed to make the upper die more accessible for inspection and cleaning than is the case where it is secured to a press platen in a fixed downwardly-facing position.

It has been proposed to secure the upper die to a platen which may be tiled in one way or another. This arrangement while offering some improvement, results in a more or less complicated and expensive machine. Furthermore, in machines of this character there is embodied but a single record-forming mold with the result that neither the press proper of the machine nor the operator's time is utilized to the best advantage.

It is an object of my invention to provide a machine for the manufacture of sound records which shall be simple and efficient in operation, and which at the same time will permit the upper die, as well as the lower, to be arranged face up preparatory to receiving record material whereby thorough inspection and cleaning of both dies may be readily effected.

It is a further object of my invention to provide a machine which shall embody a plurality of record-forming molds arranged in such relation to the press of the machine that one mold is always in position to command the operator's attention while another mold is within the press. This insures maximum efficiency of the press as well as of the operator.

Other objects of my invention are to provide a machine for the purpose specified in which the press shall automatically and temporarily close on a mold upon its arrival therein, in which heating and cooling of the press platens is likewise automatically effected; in which means are provided for automatically positioning the upper die of a mold to face up; in which means are provided for heating the dies of a mold at the operator's station, while another mold is in the press; to provide means for elevating the pressed record from whichever die it may adhere to so as to prevent its being softened while the dies are being heated at the operator's station, and to facilitate its removal from the mold.

Other objects of the invention will appear as the description proceeds.

The invention has been embodied in a machine which, in brief, embodies a hydraulic press in combination with means for successively moving a plurality of molds into and out of the press from and to an operator's station. Each mold comprises an upper die which is supported on a lower die, which in turn is shiftable over a support which surrounds a rotatable member to which said lower die is connected for movement into and out of the press, as said. Rotation is imparted to the rotatable member by a prime mover, to which the machine is connected by the operator, to shift the molds as said. After each pressing operation the machine is automatically disconnected therefrom. Between said rotatable member and prime mover is a mechanism which locks the molds in their respective positions, after the molds have been shifted, as said. Said mechanism also controls the functioning of the press; the flow of heating and cooling fluids to the press platens; the positioning of the upper die to face up as said; the elevating of the pressed record from either die as said; and the disconnecting of the machine from the prime mover.

Other features of the machine will appear from the detailed description thereof taken in connection with the accompanying drawings, forming part of this specification, in which.

Numerals 10, 11 and 12, designate three posts which are secured to and rise from a suitable base 13, the upper ends of said posts supporting a triangular upper platen 14 of a press. The lower platen of said press comprises a hydraulic ram 15 suitably mounted in a cylinder frame 16 secured to said posts. The upper platen is confined between nuts 17 on the ends of the posts and the shoulders thereon formed by the enlarged diameter of said posts for a portion of their lengths. Nuts 18 on said posts below said cylinder frame holds the latter against the other end of said enlargements. The upper platen 14 and the cylinder frame 16 are thus maintained in definite relationship.

Rising from the base 13 is a pair of standards 19 and 20 for supporting a framework 21, on or to which is secured the various mechanisms at the front of the machine or operator's station, as it may be conveniently called. On this frame-work is mounted a pair of heating elements 22 and 23 for the upper and lower die, respectively. These elements are stepped in cross section (see Fig. 9), the top of the elements being circular and of substantially the same area as the backs of the matrices of the respective dies. These features will be explained more in detail hereinafter. The elements are hollow so as to facilitate their being heated by steam; any other suitable means, however, may be employed for heating them.

The frame work 21 also supports means for lifting the lower die clear of its heating element preparatory to being shifted into the press and also means for causing relative movement of portions of the floor of the die. These features will be explained more in detail hereinafter.

Figure 3:
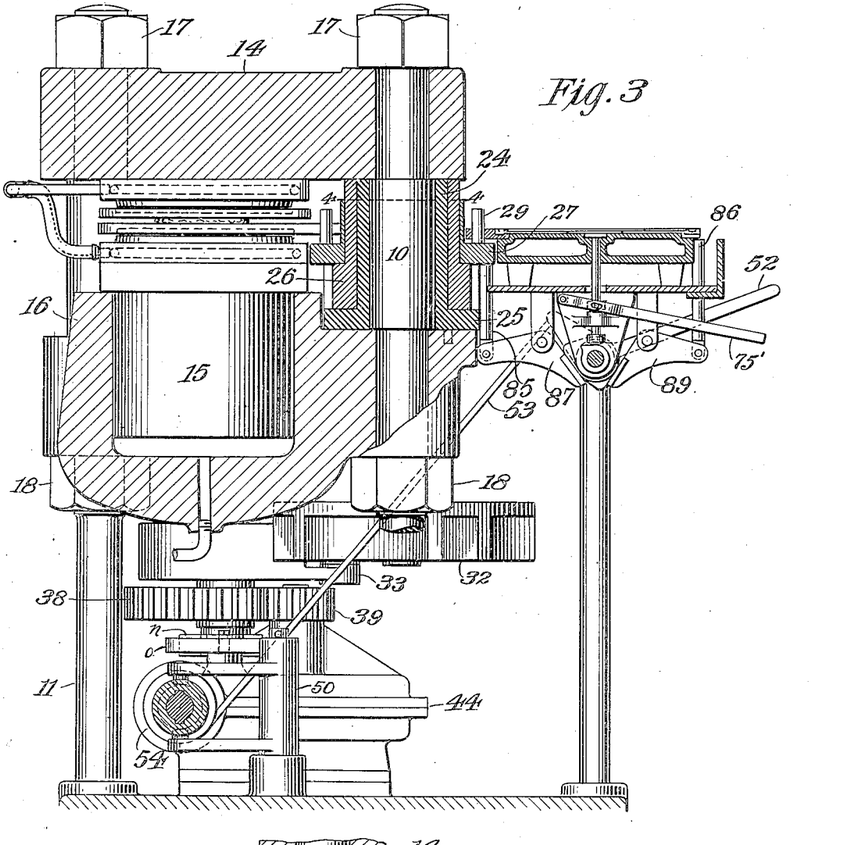
Fig. 3 is an elevation of the same viewed from the right hand side of Fig. 1, parts being in section and parts being broken away.

Encircling the enlarged portion of the front post 10 (Figs. 3 and 7) is a fixed bushing 24, having a radial flange 25 resting on the cylinder frame 16. Surrounding this bushing is a gear 26, having an extended hub to which is keyed a member 27, comprising a ring having an extended sleeve.

Figure 4:
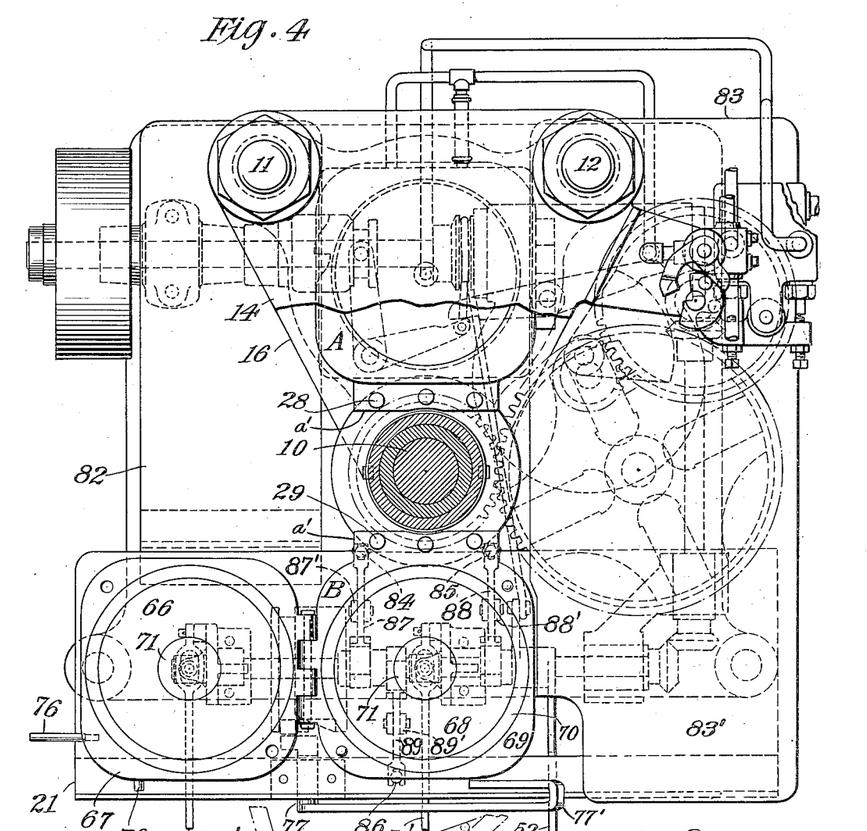
Fig. 4 is a plan view of the machine, part of the upper press platen being broken away and other parts being in section, taken on the line 4—4 Fig. 3.
Figure 7:
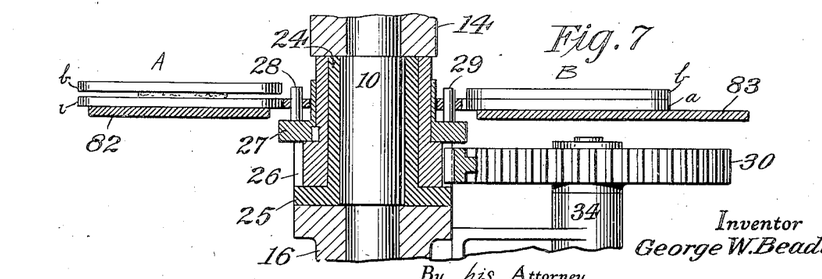
Fig. 7 is a fragmentary view of the parts shown in Fig. 3, viewed from the front of the machine showing the record-forming molds on their supporting tables.

This ring carries a plurality of pins arranged in two rows 28 and 29, of three pins each on opposite sides of its center (Figs. 4 and 7).

Record-forming molds designated generally by the letters A and B are coupled to these pins and are thus rotated about the post 10 as an axis, by the gear 26.

Each mold comprises upper and lower dies designated generally by letters $a$ and $b$ respectively. The lower die $a$ carries a perforated radial extension $a'$ through which a row of pins is passed. The perforations are made large enough to allow for an easy sliding fit for a purpose that will be explained more fully hereinafter. This form of connection between the molds and rotatable member is simple and efficient for the purpose in view and has the added advantage that it permits ready removal of a mold for any purpose as for replacement or substitution. It is obvious, however, that a different form of connection may be employed if found desirable.

The mold preferably takes the form of two hinged dies $a$ and $b$ because of the advantages inherent in that type; but the invention can be successfully practiced by using a removable upper die. In such case, however, means must be provided for accurately centering the upper die on the lower. The hinged type of mold is preferred because of the ease with which it may be opened and closed, and because of the fixed relationship of the two dies which obviates the necessity of any effort on the part of the operator of aligning the dies. This type has the further advantage that when the lower die has been located on its heating element 23, the turning of the upper die on its hinge automatically positions it on its heating element 22.

The means for imparting rotation to the gear or pinion 26 will now be described. Meshing with said pinion is a gear 30 which is keyed to one end of a short vertical shaft 31, the other end of which has keyed thereon one member 32, of a Geneva stop mechanism, of which member 33 is the other part fixed to a main or controlling shaft, to be presently described. The shaft 31 is supported in vertically aligned bearings 34, projecting from the cylinder frame 16.

The main or controlling shaft is indicated by reference numeral 35 and may be supported in any suitable manner as in the vertically aligned bearings 36 and 37 projecting from the said cylinder frame. This shaft, on account of its length, is preferably made in two sections which are adapted to be coupled in any suitable manner, as by the step connection shown as located within the bearing 36, (see Fig. 2).

As already indicated, said shaft 35 has secured adjacent its lower end the member 33 of the Geneva stop mechanism. The members 32 and 33 of said mechanism are circular in outline and overlap each other. The member 32 has alternate slots and pockets (four of each) for receiving the overlapping portions of the other member, the slot entering portion of member 33 being a vertical pin or roller. This, as it moves in its circular horizontal path, imparts a quarter turn to the member 32 in entering and leaving a slot. As the pin or roller leaves its slot, the pocket-entering portion (a segment of a circle) of the member 33 enters the adjacent pocket in member 32, functioning thereby to hold member 32 from further relation until the slot-entering portion of member 33 has again come round ready to enter the succeeding slot, whereupon the pocket-entering portion of member 33 passes out of its pocket, as will now be readily understood. In the operation of the machine, the main shaft 35 is stopped by being automatically disconnected from the prime mover, while the locking of member 32 is still effective, or differently stated, the shaft 31 does not immediately partake of rotation upon the main shaft 35 being coupled to the prime mover. This is to allow the mold at the operator's station to be lifted clear of its heating element by means operated from said shaft 35, before being swung into the press. This feature will be described more fully hereinafter.

The ratio between pinion 26 and gear 30 is such that a quarter turn of the latter imparts a half turn to the former.

The means for imparting rotation to the main or controlling shaft 35 will now be described. Keyed to said shaft adjacent its lower end and beneath the member 33 of said Geneva mechanism is a gear 38 which meshes with a pinion 39 keyed to the upper end of a short vertical shaft 40. On this shaft adjacent its lower end is keyed a worm wheel 41 which meshes with a worm 42 on a horizontal shaft 43. A casing 44 supported on the base of the machine encloses the worm and worm wheel and is provided with suitable bearings for said shafts 40 and 43.

Said horizontal shaft 43 extends from one side of the casing 44 across the base of the machine and has sleeved thereover for the major portion of its length a shaft 45 which at its outer end has keyed thereon a pulley 46 which is adapted to be continuously driven by any suitable prime mover. A suitable bearing 47, mounted on the base of the machine, provides a support adjacent the pulley 46 for the shaft 43 and its sleeve shaft 45.

For coupling the continuously rotating sleeve shaft 45 to shaft 43, there is provided a pair of cooperating dogs or coupling members 48 and 49. Member 49 is keyed to the inner end of shaft 45, while member 48 is splined on shaft 43 for movement to and from member 49, as will be readily understood. For shifting member 48 into engagement with member 49, there is provided a bell crank 50 suitably pivoted on a post 50′ rising from the base of the machine. One arm of this crank provides a pair of tines, which at their extremities are provided with opposing pins for engagement in a groove 51 in the hub of the shiftable member 48.

Said bell crank is operable from the operator's station at the front of the machine by a lever 52 which may be mounted in any suitable member on the frame work 21, but is more conveniently mounted on a horizontal shaft which extends thereunder. The function of this shaft will be more fully described hereinafter. Leading from said lever to a depending pin 52′ on the bell crank, is a cable 53, which is looped over a pulley 54, which may be conveniently mounted on the shaft 43 adjacent the casing 44.

Figure 1:
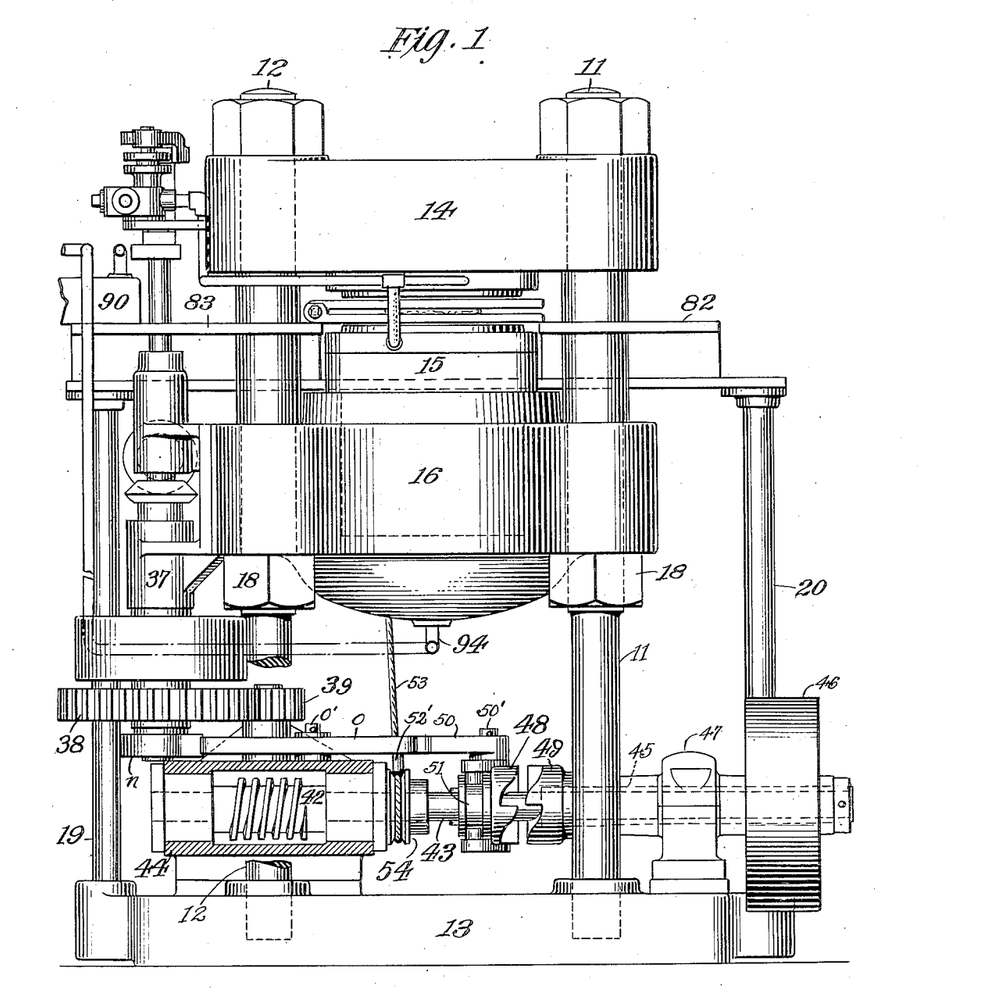
Figure 1 is a rear elevation of the machine, parts being broken away and parts being in section.
Figure 5:
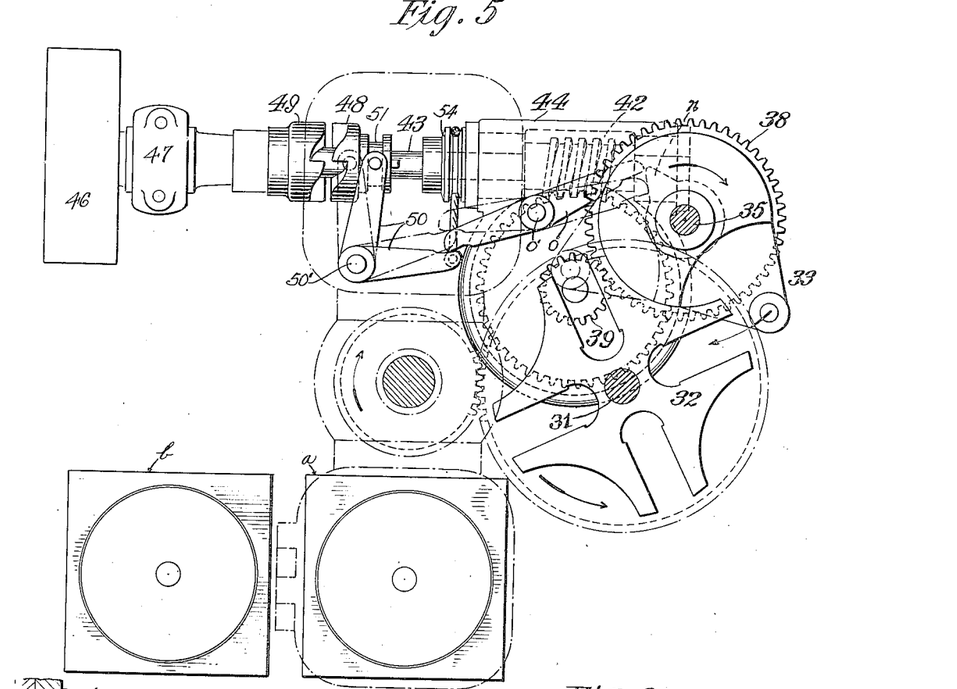
Fig. 5 is a fragmentary plan view of certain moving mechanism of the machine.

The machine is automatically disconnected from the prime mover after every pressing operation by means which will now be described. Keyed to the main or controlling shaft 35 at its lower end is a V-shaped cam N. Between this cam and the bell crank 50 is a lever O, conveniently pivoted on a post O′ rising from the casing 44. One end of this lever is positioned in the path of the said crank, while the other is in the path of the cam (see Figs. 1 and 5). It will now be understood that the cam gives a partial rotation to said lever, which in turn rocks the bell crank sufficiently to move the member 48 out of engagement with the member 49 on the continuously rotating sleeve shaft 45.

Figure 8:
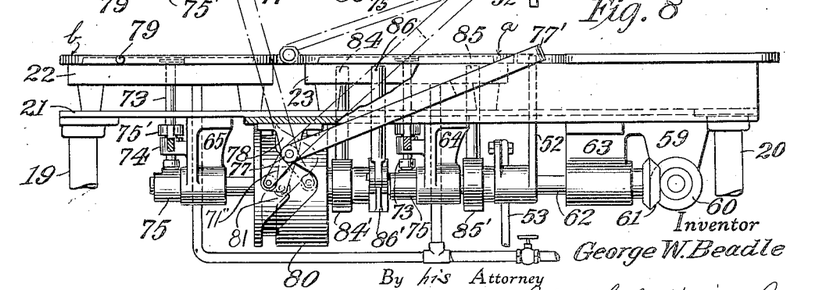
Fig. 8 is a fragmentary view looking at the front of the machine, parts being broken away and parts being in section.

For operating certain mechanism at the operator's station, there is keyed to the main or controlling shaft 35, between the vertical bearings 36 and 37, a bevel gear 55, which meshes with a similar gear 56 keyed on one end of a horizontal shaft 57. This shaft is supported adjacent gear 56 by a bearing 58 projecting from the cylinder frame 16 and near its other end by a bearing 59 suitably hung from the frame work 21. This end has keyed to it a bevel gear 60 which meshes with a similar bevel gear 61, keyed on a shaft 62 extending horizontally beneath the frame work 21. This shaft is supported in bearings 63, 64 and 65, depending from the frame work 21 (see Fig. 8) and serves to operate mechanism which will be subsequently described.

Each record forming mold, as already indicated, comprises lower and upper dies $a$ and $b$. The floor of the upper die comprises an engraved matrix 66, preferably removably secured in a frame 67. The floor of the lower die contains a differently engraved but otherwise similar matrix 68, also removably held in its frame 69. This frame is substantially the same as the upper frame, except for the fact that it has a perforated radial projection $a'$ whereby it may be passed over a row (28 or 29) of coupling pins on the rotatable member surrounding the front press post 10. The following detailed description of the lower die is therefore to be taken as applying to the upper die as well.

Figure 9:
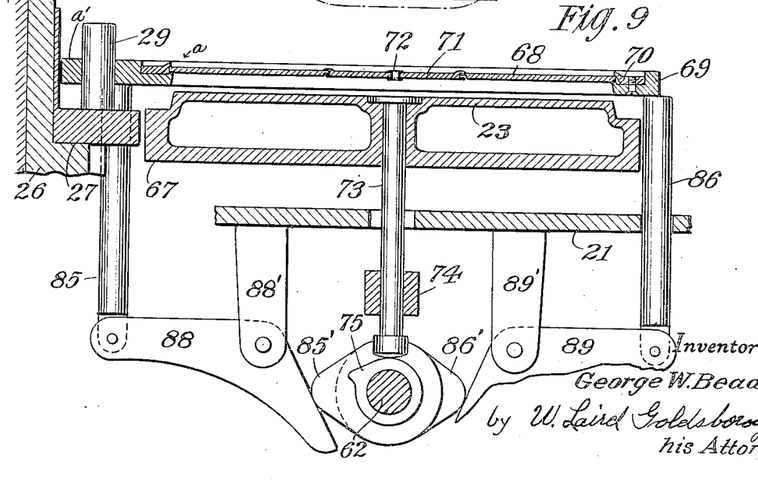
Fig. 9 is an enlarged sectional view showing the lower die of a mold in a certain position with respect to the heating means and other mechanism at the front of the machine.
Figure 10:
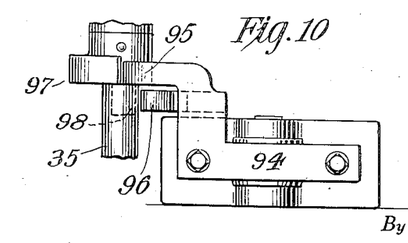
Fig. 10 is a fragmentary end elevation of a portion of the mechanism shown in Fig. 6 looking in the direction of the arrow $x$.

Referring now to Fig. 9, it will be seen that the matrix 68 is supported on an annular shelf formed by counter boring the frame 69 from the top. The matrix is secured to its seat by means of a clamping ring 70, which is adapted to be drawn against the margin of the matrix by any suitable means, as by screws passing through said shelf. It will now be seen that the matrix is stepped inwardly from both sides of the frame. This construction permits the back of the matrix to be directly heated or cooled, as the case may be, while at the same time removing it from objectionable proximity to the table or support over which the die is moved to and from the press. The stepped back of the die also facilitates the locating of the same on its heating element and press platen which take the form of frustrums of cones.

A loaded mold in leaving the press is swung in a circular path until the lower die is over its heating element 23 at the operator's station where it will be immediately opened either by hand or mechanically by means which will be presently described. Inasmuch as the lower die is slidably connected to the rotatable member (on a row of coupling pins thereon) it automatically centers itself on its heating element. To prevent the molded record from being heat softened, means are provided for elevating the record from contact with the heated matrix or floor of the die as soon as the die has centered on its heating element.

The molded record adheres sometimes to the upper die and sometimes to the lower. The record-elevating means are therefore duplicated and the description in connection with the lower die is to be taken as applying to the upper.

The floor of the die comprises the matrix proper and a center disk 71 having a label receiving button 72 thereon. This disk is adapted to be moved upward relatively to the matrix by means of a vertically movable headed plunger 73 having its upper end passing through a bearing in the heating element and its lower end guided in a bearing 74 projecting laterally from the bearing hangers for shaft 62. Secured to this shaft is a cam 75 which serves to elevate the plunger, which in turn elevates the disk 71. The record is thus temporarily elevated for a period sufficiently long to permit removal by the operator and heat-softening of the record is avoided in the meantime. Inasmuch as shaft 62 is geared to rotate in unison with the main or controlling shaft 35, the above described record-elevating means is entirely automatic in action. It sometimes happens that the operator is delayed in removing a record while it is elevated, as said. There is therefore provided (Figs. 3, 4 and 8), a hand lever 75' for elevating the plunger 73. This lever is suitably pivoted to the frame work 21 at a point to one side of the plunger and is split between its ends to straddle the plunger, the split sides being suitably trunnioned to the plunger. It will be understood that the shaft 62 will cease to rotate immediately after the cam 75 has passed the plunger 73 by reason of the main shaft 35 being automatically disconnected from the prime mover by mechanism already described.

As indicated above, the dies of a mold may be separated by mechanical means or manual means. For the latter there is provided a handle 76 (Fig. 4) on the upper die opposite its hinge. The mechanical means for swinging the upper die about its hinge includes a two-armed rock shaft 77, journaled in a bracket 78, depending from the framework 21, the axis of the shaft being substantially parallel to that of the mold hinge. On the frame 67 of the upper die is a lug or pin 79 projecting laterally therefrom into the path of the long arm 77' of said rock shaft. This long arm is swung up and down once during a revolution of the shaft 62 and the means for effecting such movement conveniently comprises a member 80, fixed on the shaft, having a circumferential groove therein in which the short arm 71'' of the rock shaft is operatively confined, the groove being sharply offset at one point to produce a cam 81 for swinging the long arm through an arc sufficiently great to elevate the die 68 beyond its vertical position from whence it will fall flat upon its heating element 22.

For supporting the molds while being shifted from the press to the operator's station and vice-versa, there are provided horizontally disposed tables 82 and 83, one at either side of the front or pivot post 10. Both tables preferably extend to the back or rear of the machine where they are secured or supported in any suitable manner, as by the posts 11, 12, while at their front ends they are preferably supported by the frame work 21 in any suitable manner. The right hand table 83 as viewed in Fig. 4, preferably extends forwardly over said framework forming a shelf 83' for supporting tools or the like. The inner edges of said tables are preferably parallel and the distance between them is such that a mold in position between the upper press platen and ram is marginally supported by them instead of resting directly on the ram when the latter is in lowered or neutral position (see Fig. 1). The ram in rising lifts the mold off said tables, carrying it up against said platen. In lowering the mold is again deposited on said tables ready to be shifted to the operator's station.

As has been already pointed out above, the backs of the dies comprising a mold are stepped or recessed. The upper and lower platens of the press are therefore also stepped in a manner corresponding to the heating elements 22 and 23 at the operator's station so as to contact directly with the backs of the matrices of said dies during the pressing operation. These steps are arranged to have heating and cooling fluids passed through them to alternately heat and cool the floor of the dies during the pressing operation. The passage of these fluids is mechanically controlled by the main or controlling shaft 35 in a manner which will be explained hereinafter.

As has already been explained above, when a mold is shifted from the press to the operator's station, the lower die automatically seats or centers itself on its heating element 23. After the record material is placed on the lower die, the upper die is swung by hand on its hinge to face down on said material and is therefore clear of its heating element 22. The lower die, however, still remains in place on its heating element and must be lifted clear of the same before the mold can be swung into the press by means which will now be described.

For accomplishing this there is provided a plurality of mechanically actuated push rods 84, 85 and 86, which provide a three-point support for the die during its elevation. Rods 84 and 85 are arranged in close proximity to the rotatable member or post 10 to which member the die is coupled. Rod 86 is arranged on the other side of the die for engagement with its margin. Connected to the lower ends of said rods are the levers 87, 88 and 89 respectively, suitably pivoted to their brackets 87', 88' and 89', depending from the frame work 21. Said rods 84, 85 and 86 are raised and lowered by means of cams 84', 85' and 86', fixed on the shaft 62 extending horizontally beneath the said frame work. Said cams impart a limited angular movement to said levers which in turn act on said rods as will be readily understood.

The mode of operation of the mold elevating mechanism is as follows: As soon as the operator has thrown in the clutch to start the machine, the shaft 62 immediately partakes of rotation by reason of its connection to the main shaft 35. The die is slid upwardly sufficiently to clear its heating element on its row of coupling pins by the push rods 84, 85 and 86, which are actuated from the shaft 62, as said. The relation of the two members of the Geneva mechanism has now become such that movement is imparted to the rotatable member to which the molds are connected for swinging movement. The mold is, therefore, swung over the heating element onto the table 82 on its way to the press. As the shaft 62 continues to rotate the push rods will descend to permit the mold from the press to be located on the heating elements.

Figure 2:
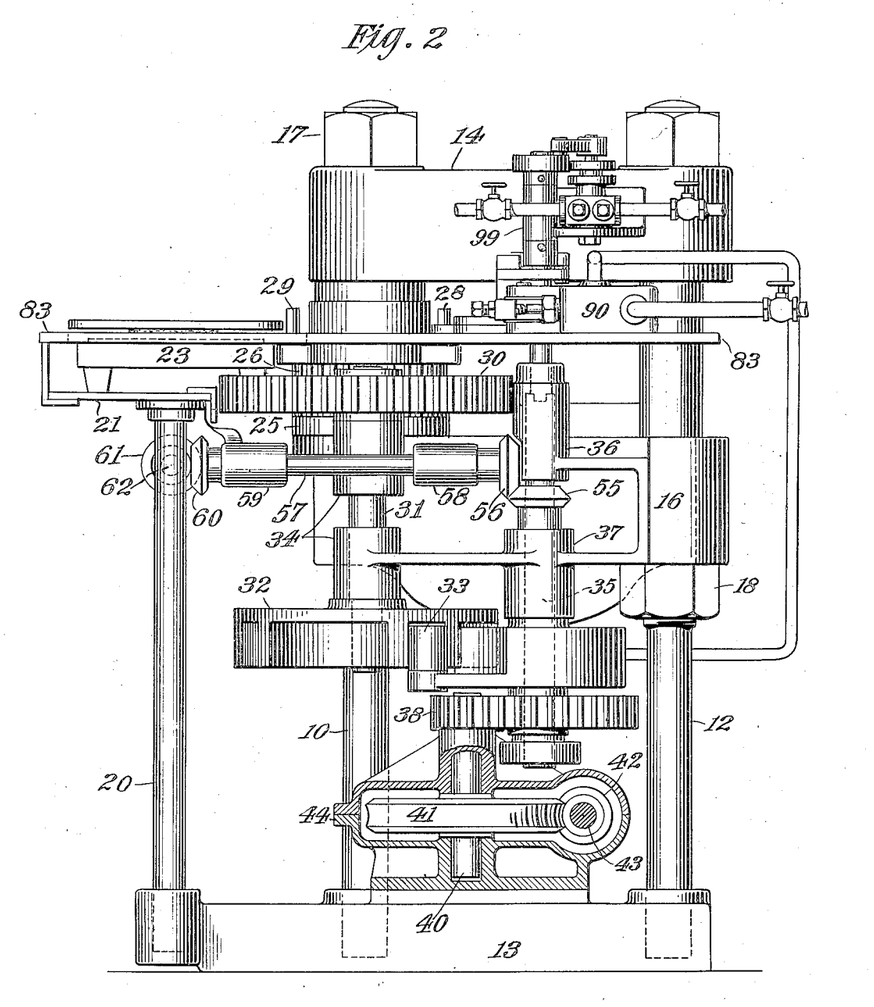
Fig. 2 is an elevation of the same viewed from the left hand side of Fig. 1, parts being in section.

The press, as has been stated above, automatically temporarily closes on a mold upon its arrival therein. For effecting this, there is provided a valve mechanism indicated generally by numeral 90 (Fig. 6) which is adapted to be actuated by the main or controlling shaft 35. This valve is conveniently supported on the table 83 (Fig. 2). The valve includes a fluid passage 91 which is controlled by two spring-pressed valves 92, 93. Fluid under head enters at S and tends to keep the valve 93 on its seat; when the valve is raised fluid flows to the ram cylinder through conduit R and acts to keep the other valve 92 on its seat. When the latter is raised the ram is released, the fluid passing out through waste conduit W.

Figure 6:
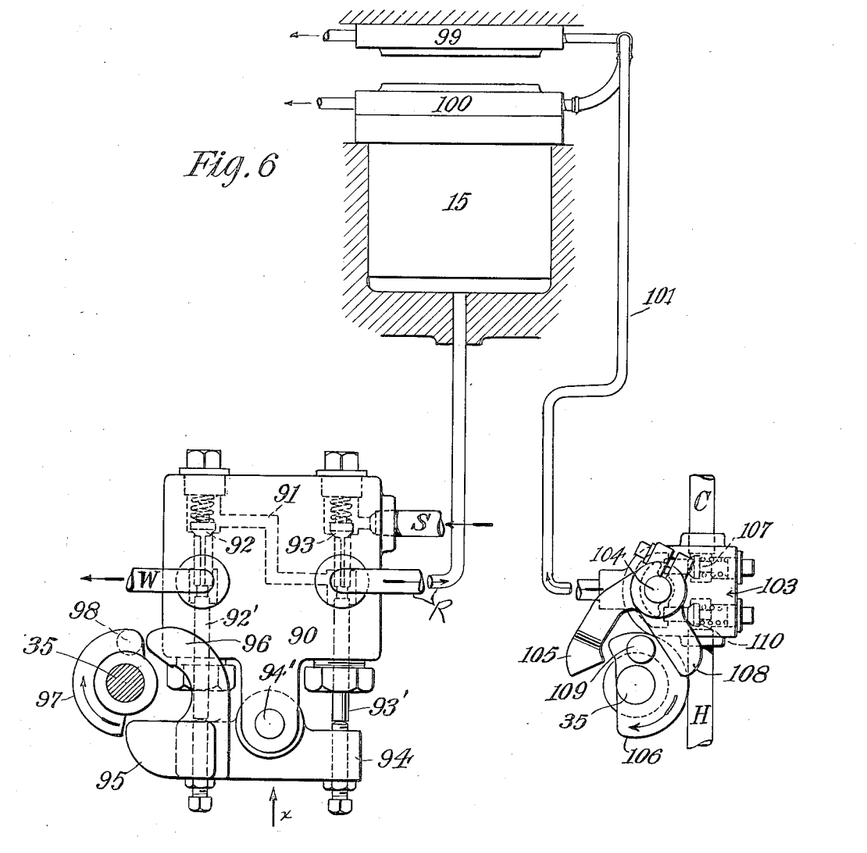
Fig. 6 is a diagrammatic view of the means for actuating the press and for controlling the heating and cooling fluids for the press platens.

The said valves are alternately opened and closed by means of push rods 92', 93', suitable stuffing boxes for the latter preventing leakage. For operating the push rods, a lever 94, suitably pivoted to the valve body as at 94', is adapted to be actuated by a cam and roller arrangement fixed to the main shaft 35. One end of the lever is, in effect, bifurcated to provide two members 95 and 96. Member 95 lies in the path of the cam 97 which is a segment of a circular disk and functions, therefore, to retain the valve 93 in open position for a period sufficiently long to effect the compressing and chilling of the record. Member 96 lies in the path of a roller or pin 98 depending from the cam 97, said roller functioning to open the valve 92 to release the ram after a record has been made. Adjustable screws carried by the lever allow suitable adjustment to be made. For convenience of illustration the lever and cam arrangement is shown in Fig. 6 as in neutral position.

The steps on the press platens as hereinbefore stated, arranged to have heating and cooling fluids passed through them to alternately heat and cool the floor of the dies during the molding of the record. In Fig. 6, these steps are indicated by numerals 99 and 100, and are shown as connected by a conduit 101 to a valve designated generally 103, which is connected by conduits C and H to supplies of cold and hot fluids generally cold water and steam.

This valve is controlled from the main shaft 35 by a cam arrangement somewhat similar to that used for controlling the press. Journalled in the valve is a shaft 104 having secured to it an arm 105 which is offset at its free end, to lie in the same plane as a cam 106 which is fixed to the main shaft 35. This cam acts on said arm to rock the shaft 104 on its axis to hold the valve 107 in the cold water conduit open for a substantial part of revolution of the main shaft 35. The shaft 104 is also provided with a second arm 108 which lies in the path of a pin or roller 109 at one side of the axis of said main shaft. This pin 109 acts on the arm 108 to rock the shaft 104, which in turn acts on the steam valve 110 to open it for a comparatively short time. The shaft 104 is provided with arm-like extensions for abutting the stems of the valves 107, 108 for opening them, as said.

The machine has been described in considerable detail. This is not to be taken as a limitation of the invention, however, for it is obvious that various changes can be made by a skilled mechanic without departing from the spirit of the invention. The various features of the invention are intended to be set out in the claims.

What I claim as new and desire to secure by Letters Patent is:

1. In a machine for pressing records, a pair of dies both of which are adapted to face up preparatory to receiving record material but otherwise are in facing alignment, said dies comprising a record forming mold, a plurality of such molds connected to a common rotatable means adapted to successively rotate them into and out of pressing position, means for supporting the molds during their rotation, in combination with means for successively pressing the dies toward each other to give form to the material between them.

2. The machine as specified in claim 1, together with means operating on a mold containing a pressed record to elevate said record from the floor of either die of said mold during the pressing of another mold, as said.

3. The machine as specified in claim 1, together with means for automatically exposing the contents of a mold to view while the dies of one mold are being pressed toward each other, as said.

4. In a machine for pressing records, the combination with a press, of a rotatable member adjacent the press, an upper die, means for supporting the same comprising a lower die connected to said member and means for supporting the dies during their rotation, and means for imparting rotation to said member.

5. In a machine for pressing records, the combination with a press, of a rotatable member adjacent the press, a mold comprising a pair of hinged dies, means for movably connecting one of said dies to said member, means for imparting rotation to said member for swinging said mold into and out of said press and means for supporting the dies during their rotation.

6. In a machine for pressing records, the combination with a press, of a rotatable member adjacent the press, a plurality of vertical posts carried by said member, a die movably mounted on said posts, means for imparting rotation to said member for swinging said die into and out of said press and means for supporting the dies during their rotation.

7. In a molding machine, a rotatable member, an upper die and a lower die for supporting the same, means movably connecting the lower die to said member, means forming a supporting path for said lower die, said dies comprising a mold, a plurality of such molds, a press on one side of said rotatable member and an operator's station at the opposite side, means for imparting rotation to said rotatable member whereby to shift said molds from said station to press and vice-versa, means for automatically locking the molds against further rotation upon said shifting being effected, and means for automatically and temporarily closing the press on a mold upon its arrival therein.

8. The combination as in claim 7, together with means controlled by said means for imparting rotation to said rotatable member for automatically first heating and then cooling the mold within the press.

9. The combination as in claim 7 together with means for automatically exposing face up the dies of the mold at the operator's station.

10. The combination as in claim 7, together with means operating on the mold at the operator's station to move the molded object relatively to the dies of said mold.

11. In a molding machine, a rotatable member, a horizontal support around the same, a plurality of molds connected to said member for movement in a circular path over said support, a press in the path of said molds, and means for automatically and temporarily closing the press on the molds upon their successive arrival therein.

12. The machine as specified in claim 11, together with means for automatically opening another mold to expose its contents during the pressing of a mold as said.

13. In a machine for pressing records, the combination with a press, of a rotatable member adjacent the press, record forming means connected to said member and projecting radially therefrom, means for imparting rotation to said member for swinging said record forming means into and out of said press and means for supporting said record-forming means during rotation.

14. In a machine for pressing records, the combination with a press, of a rotatable member adjacent the press, record-forming means slidably connected to said member and projecting radially therefrom, means for imparting rotation to said member for swinging said record-forming means into and out of said press and means for supporting said record-forming means during rotation.

15. In a molding machine, in combination, a press having platens adapted to receive temperature-changing fluids, a rotatable shaft, and means operated by the shaft during a single cycle of movement for automatically controlling the closing and opening of said press and the flow of temperature-changing fluids through said platens.

16. In a molding machine, in combination, a press, a mold adapted to be moved into and out of said press, a rotatable shaft, and means between said mold and press adapted to be actuated by said shaft for moving said mold into the press and for closing the press on said mold.

17. In a molding machine, in combination, a press, a mold comprising a lower die and an upper die adapted to be supported therein, and a rotatable shaft for automatically controlling the movement of said mold into and out of said press and for automatically temporarily closing said press in the mold upon its arrival therein.

18. In a molding machine, in combination, a pair of molds, a rotatable member to which said molds are connected for swinging movement in a horizontal circular path, a press and an operator's station on opposite sides of said rotatable member, means for shifting said molds from the press to the operator's station and vice-versa, and for controlling the press comprising a controlling shaft arranged to make one revolution in effecting said operations.

19. In a molding machine, in combination, a main or controlling shaft, a prime mover adapted to rotate said shaft, means adapted to automatically disconnect the shaft from a prime mover after completing one revolution, a press having platens adapted to receive heating and cooling fluids, and means under the control of said shaft during said single revolution for closing and opening said press to compress material inserted therein and for alternately admitting first heating and then cooling fluid to said platens during the period of revolution of said shaft.

20. In a molding machine, in combination a main or controlling shaft adapted to be automatically disconnected from a prime mover after completing one revolution, a plurality of molds, a rotatable member, a press, means connecting said shaft and rotatable member including a mechanism permitting one mold to be substituted for another in the press, and means under the control of said shaft for temporarily closing the press on a mold upon its arrival therein.

21. In a molding machine, in combination, a base, a plurality of posts rising therefrom, a press supported by said posts, a rotatable member mounted on one of said posts, a plurality of molds connected to said member for shifting movement into and out of said press means for supporting said molds during their shifting movement, means for controlling the operation of said press and the shifting of the molds into and out of said press comprising a controlling shaft adapted to be automatically disconnected from its prime mover after the control of the press and molds has been effected.

22. In a molding machine, in combination, a base, a plurality of posts rising therefrom, a press platen secured to said posts, a cylinder frame secured to said posts below said platen, a ram mounted in said frame for movement toward and from said platen, a rotatable member mounted on one of said posts, a plurality of molds secured to said member, a support for said molds arranged about the axis of said member, and means for shifting the molds to change places in the press and for temporarily closing the press on a mold arrived therein, comprising a controlling shaft adapted to be automatically disconnected from its prime mover at the end of the cycle of movements above specified.

23. In combination, a press, a rotatable member adjacent the press, a mold connected to said member, means for imparting rotation to the member to move the mold into and out of pressing position and stationary means for supporting the mold at its under side during rotation.

24. In combination, a press, a rotatable member adjacent the press, a plurality of molds connected to said member in radially spaced relation, means for imparting intermittent rotation to the member to move the molds successively into and out of pressing position and stationary means for supporting the mold at its under side during rotation.

25. In combination, a press adapted to be closed and opened, platens carried by the press, means for effecting temperature change in the platens, and a controlling member adapted to control the opening and closing of the press and the temperature changing means as a complete automatic cycle during a predetermined movement of said member.

26. In combination, a press adapted to be closed and opened, platens carried by the press, means for effecting temperature change in the platens, and a controlling shaft adapted to control the opening and closing of the press and the temperature changing means as a complete automatic cycle during a single revolution thereof.

27. In combination, a press adapted to be closed and opened, platens carried by the press, means for effecting temperature change in the platens, a rotatable member adjacent the press, a mold connected to said member means for supporting the mold during rotation, and a controlling member adapted to control the opening and closing of the press and the temperature changing means, and the rotatable member to move the mold into and out of pressing position, as a complete automatic cycle during a predetermined movement of said member.

28. In combination, a press adapted to be closed and opened, a rotatable member, a mold connected to said member means for supporting the mold during rotation, and a controlling member adapted to control the opening and closing of the press, and the rotatable member to move the mold into and out of pressing position, as a complete automatic cycle during a predetermined movement of said member.

29. In combination, a press adapted to be closed and opened, a mold, means adapted to move the mold into and out of pressing position, and a controlling member adapted to control the opening and closing of the press and the operation of said mold-moving-means as a complete automatic cycle during a predetermined movement of said member.

30. The combination, as in claim 29, together with a prime-mover for the controlling member, and means for automatically disconnecting the member from the prime-mover at the end of said predetermined movement.

31. In a record press, a plurality of pressing molds, each comprising a pair of dies arranged to move relative to each other, like the leaves of a book, rotatable means connected to the molds and adapted to successively move them into and out of pressing position and means for supporting the molds during rotation.

32. The invention, as in claim 31, together with means for removing the record from either die of a mold during the pressing of a record in another mold.

33. The invention, as in claim 31, together with means for separating the dies of one mold, while those of another are being moved together.

34. In combination with a record press, rotation-imparting means, a member rotated thereby and carrying a die, another die carried by the first die and means for supporting the dies during rotation.

35. In a press, a rotatable member, a mold connected to the rotatable member and comprising a pair of hinged dies, means for imparting rotation to said member for swinging the mold into and out of the press and means for supporting the dies during rotation.

36. In a press, a rotatable member, a plurality of molds connected to the rotatable member, an operator's station, means for imparting rotation to the rotatable member to shift the molds from the station to the press and vice versa and stationary means for supporting the mold during rotation.

37. The combination, as in claim 36, together with means adapted to automatically open the molds at the operator's station.

38. The combination, as in claim 36, together with means at the operator's station, adapted to move the molded object relatively to the mold.

39. In a press, a rotatable member, a plurality of molds connected to the rotatable member, means forming a supporting path for said molds, an operator's station, and means for imparting rotation to the rotatable member to shift the molds from the station to the press and vice versa.

40. In a press, a rotatable member, a plurality of molds connected to the member for movement with the member, means for supporting the molds during their movement pressing means in the path of the molds, and means adapted to automatically operate the press as the molds are successively brought into relation therewith.

41. The combination, as in claim 37, together with means adapted to automatically open one of the molds, while another is in relation with the pressing means.

42. In combination, a press, a member, a mold connected to the member, means for rotating the member to move the mold into and out of pressing position and stationary means for supporting the molds during rotation.

43. In combination, a press, a pair of molds each including oppositely facing dies, a common support for said molds adapted to support one when the other is in the press, means for alternately moving said molds into and out of the press, and means for automatically engaging and moving one of the dies of each of the molds for exposing both die faces of each mold upon movement of the mold out of the press.

44. In combination, a press, a pair of molds each including a downwardly facing die, means for alternately rotating said molds about a common axis into and out of the press, and means for automatically exposing the die faces upon movement out of the press, the last means including an arm operated to engage and swing one of the dies to have all the dies of a mold face the same direction.

45. In combination, a press, a mold including a downwardly facing die, said mold adapted to be rotated about a fixed axis into and out of the press, and means for automatically exposing the face of said die upon movement out of the press, the means including an arm operated to engage and swing the downwardly-facing die to cause the same to face upwardly.

46. In combination, a press, a mold including a downwardly facing die, said mold adapted to be rotated about a fixed axis into and out of the press, means to engage and move the downwardly-facing die to expose its face upon its movement out of the press, and means for automatically removing the molded article from the mold upon exposing said die face.

47. In combination, a press, a pair of molds each including a downwardly facing die, a common support for said molds adapted to support one when the other is in the press means for alternately moving said molds into and out of the press, means cooperating therewith for automatically opening and closing the press, and means for automatically engaging and moving the downwardly-facing dies for exposing the die faces upon movement out of the press.

48. In combination, a press, a mold including a downwardly facing die, means for rotating said mold about a common axis into and out of the press, means cooperating therewith for automatically engaging and moving the downwardly-facing die for exposing the die face upon movement out of the press, and means for automatically removing the molded article upon exposure of said die face said last means being also manually operable.

49. The invention as in claim 48, characterized by manual-starting and automatically-stopping means whereby all of said operations are performed as a complete cycle.

In testimony whereof, I affix my signature.

GEORGE W. BEADLE.